United States Patent Office 2,993,875
Patented July 25, 1961

2,993,875
COLORING POLYCHLOROTRIFLUOROETHYLENE WITH A COLOR MASTERBATCH OF A COPOLYMER OF TRIFLUOROCHLOROETHYLENE AND VINYLIDENE FLUORIDE AND COMPOSITION THEREOF
Bruce H. Maddock, Fanwood, N.J., assignor to Union Carbide Corporation, a corporation of New York
No Drawing. Filed June 27, 1957, Ser. No. 668,300
6 Claims. (Cl. 260—41)

This invention relates to uniformly colored trifluoromonochloroethylene resin compositions and more particularly to an improved process for preparing colored fluorothene resin compositions and to end products prepared therefrom.

Trifluoromonochloroethylene resins of the type represented by the so-called fluorothene resins have found substantial application where resistance to high temperatures with retention of good electrical and mechanical properties is an important factor. Especially are fluorothene resins and the like useful for high temperature duty electrical wire insulation where high mechanical strength, good aging stability and electrical characteristics are of prime importance.

Further, it is desirable not only for esthetic reasons but for purposes of coding, tracing, identification, etc., that articles fabricated from fluorothene resin compounds be made available in a variety of colors, shades or tints.

Permanency of color is best obtained by adding a pigment to the plastic base prior to extrusion or molding so that the color is an integral part of the article rather than an exterior coating or film. This integrated-pigmentation is also more desirable from an economic viewpoint.

However, the preparation of colored fluorothene compositions poses a unique and difficult problem since hot processing techniques such as Banbury and/or milling methods or the like which are widely used to prepare colored compositions and color masterbatches from other thermoplastic resins are not generally practicable with fluorothene because commercial compounding equipment is ordinarily incapable of reaching the temperatures, about 230–260° C., required to flux such resins. Consequently two alternative procedures, generally referred to as the "dry blending" and "double extrusion" methods, have been adopted.

In the dry blending method, natural (i.e., uncolored) fluorothene resin pellets or granules and dry powdered pigments are mixed together in conventional apparatus such as a tumbling drum or conical blender and the resultant mixture is then extruded, molded, or otherwise formed into the final product. This method, which is used by most fabricators of coated electrical wires because they are unequipped for more complex procedures, possesses several severe shortcomings. The degree of color dispersion is erratic, irreproducible and generally unsatisfactory. The extruded insulation contains numerous pigment agglomerates, streaks and color voids which make product appearance unacceptable and which degrade tensile, thermal and electrical properties to unacceptable levels. The non-uniform dispersion of colorants in the extrusion compound causes extrusion difficulties which lead to uneven, rough coatings which are unacceptable. Furthermore, the pigments tend to sort out, i.e., settle to the bottom of the container; and all of the foregoing deficiencies become magnified as this material at the bottom of the container reaches the extruder or molding machine. Also, the handling and blending of the dry, powdered pigments in this manner by extruders or molders, who are generally unequipped to cope with dusty materials, is a messy and sometimes unhealthful operation.

In the so-called double extrusion method, natural fluorothene resin pellets, chips or powder and inorganic pigments are dry blended at room temperature, said mixture is then extruded and pelletized or otherwise reduced to particles of suitable size, and said pellets or particles are then reextruded or molded into the final product. This method can be used by only a few wire coaters who possess the necessary auxiliary equipment. Color dispersion is much improved over the first-cited method, but is still imperfect. The additional process operations, i.e., extra extrusion and pelletizing step, are costly and retard production. The major—and prohibitive—deficiency however, is the degree of molecular degradation which results from double extrusion. This causes more rapid embrittlement and a concomitant loss of mechanical and electrical properties during high temperature service which severely limit the utility of the product.

Articles formed from colored compositions prepared by either of the foregoing methods are therefore generally inferior in appearance, surface uniformity, thermal stability, mechanical and electrical properties to natural, i.e., uncolored, articles.

For comparison with products made by the new process of this invention, a sample of colored fluorothene resin insulated wire was made according to a standard prior art method as follows:

PRIOR ART COLORED FLUOROTHENE INSULATED WIRE

Two thousand, two-hundred fifty-nine grams of Bakelite's FYTH, and uncolored fluoroethene resin having a melting point of about 210° C., specific gravity of 2.12, a melt viscosity of 15 megapoises at 230° C., a flow index of 12.5 to 35 at 265° C. and having the formula

(Bakelite Bulletin J–739, entitled "Fluorothene Resins," copyright 1954, Union Carbide and Carbon Corporation) were blended together with 11.35 grams of Calco's Ultramarine Blue ZD–1401 pigment for 30 minutes at room temperature in a conical blender. This intimate mixture was then extruded onto #22 silver-plated copper, multistrand wire with a Modern Plastics Machinery Co. 1½ inch bore extruder fitted with a wire coating head. This mixing process is the standard dry blending method used in the prior art for extrusion of colored fluorothene.

Specimens were taken at random, examined for appearance and subjected to the identical tests described in Example III, namely, (a) voltage breakdown, (b) heat shock, (c) heat aging stability, and (d) cold bend after heat aging. Samples showed color specks and voids and had a sandy, rough surface. Under the voltage breakdown test, the average breakdown voltage for five samples was 14.7 kilovolts; and under the heat shock and heat aging stability tests, was 14.6 kilovolts and 9.0 kilovolts, respectively. Only one sample out of the five subjected to the cold bending after heat aging met the minimum requirements of MIL–W–12349 by surviving 2000 volts R.M.S. for 1 minute. Breakdown of this sample occurred at 3.5 kilovolts.

A way has now been found to manufacture uniformly colored extruded or molded articles of polytrifluoromonochloroethylene without subjecting the polymer to temperatures which cause undue molecular degradation. This is accomplished by compounding together the pigments and a copolymer of trifluoromonochloroethylene and vinylidene flouride into a color concentrate or masterbatch and then mixing this masterbatch with natural, uncolored fluorothene resin prior to extrusion.

The copolymer of vinylidene fluoride and trifluoromonochloroethylene may be worked at considerably lower temperatures then polytrifluoromonochloroethylene alone; conssequently, thorough mixing of pigment and copolymer can be accomplished with standard hot processing apparatus as, for instance, a roll mill, Banbury mixer or the like, without having to resort to costly modifications necessary to operate at the high temperatures required to flux fluorothene resins; and said mixture can be reduced readily to small chips or granules by conventional granulating, slitting, dicing or other suitable means. The masterbatch in turn can be mixed satisfactorily with the natural fluorothene resin merely by dry blending masterbatch and fluorothene particles as for example by tumbling them together in a drum or conical blender; and single extrusion of such mixtures yields fully satisfactory, uniformly colored, even and smooth surfaced products whose mechanical, electrical and thermal properties are, in some cases, very nearly as good as, and in other cases, perhaps even better than those of similar articles prepared from the parent, natural fluorothene resin, and the extrusion characteristics appear, if anything, to be slightly better.

All of the advantages of the prior art methods are maintained while all of the disadvantages are avoided. The danger to health and safety of employees which is commonly associated with work involving materials such as dusty pigments is avoided by the fabricator, who blends only substantially dust free materials. The dust problem is placed with the producers of the color masterbatch who have facilities to deal with it. Also, a fabricator need inventory only one base resin, the natural fluorothene, and can perform pigmentation of his product "on the job."

The ratios of constituents of three separate compoundings must be considered in carrying out the new coloring process: first, the ratio between vinylidene fluoride and trifluoromonochloroethylene in the copolymer of the masterbatch, second, the ratio of pigment to copolymer in the masterbatch and third, the ratio of masterbatch to fluorothene resin in the final extrusion mix.

Suitable chlorotrifluoroethylene-vinylidene fluoride copolymers are those containing from about 1 to about 20 percent by weight vinylidene fluoride and possessing sufficient plasticity at 195° C. to be compounded and mixed satisfactorily with the colorants at or below said temperature to form a substantially homogeneous color masterbatch. All other things being equal, the processability of the chlorotrifluoroethylene-vinylidene fluoride copolymer increases, i.e., its plasticity increases and/or its lowest plasticating and compounding temperature decreases, with increasing vinylidene fluoride content; but concomitantly, its compatibility with the fluorothene resin decreases. For instance, copolymers containing up to about 8 percent vinylidene fluoride are generally compatible in all proportions with fluorothene resins; whereas those containing more than about 8 percent vinylidene fluoride generally tend to have limited compatibility—but are still compatible, as a rule, to the extent of about 25 to 50 parts or more by weight per 75 to 50 parts fluorothene resin, depending on the particular resin and copolymer involved. Since said copolymer concentrations, i.e., 25 to 50 percent or more, are generally easily sufficient to provide homogeneously colored fluorothene resin compositions having the desirable attributes previously cited, such copolymers are useful in the practice of the hereindescribed process and are therefore within the purview of this invention. All things considered, copolymers containing about 3 to 10 percent vinylidene fluoride are generally preferred.

In compounding the copolymer and pigments together to form a color concentrate or masterbatch, suitable compositions result from mixing from 1 to 70 parts by weight, and preferably 5 to 45 parts by weight of pigment with 100 parts by weight of the copolymer.

The relative proportions of masterbatch to fluorothene resin may vary over a considerable range, depending in the main upon the following factors: (a) the color intensity and transparency or opacity desired in the final product, (b) the color-imparting ability of the pigment chosen, and (c) the relative amounts of pigment and copolymer in the masterbatch. While the desirable properties of the fluorothene resin may be retained substantially undiminished up to the point where the weight ratio of the copolymer to monochlorotrifluoroethylene resin is as high as about 2:3, beyond this point an undesirable decline in thermal chracteristics becomes evident. The preferred composition contains copolymer and fluorothene in a ratio of not greater than about 1:1.85. Pigment contents ranging from 0.1 percent to 4 percent pigment based on overall composition as 100 percent are generally preferred, but the percentage of pigment in the overall composition may be as high as about 15 percent or as low as about 0.01 percent.

The copolymers of chlorotrifluoroethylene and vinylidene fluoride may be either uniform or non-uniform in polymer distribution. As vinylidene fluoride is the faster component in the copolymerization to form the copolymers useful in this invention, a non-uniform polymer results when the monomers are charged in a given ratio, and polymerization conducted without additions or withdrawals of monomers. A uniform copolymer results when the ratio of monomers is maintained approximately constant throughout the polymerization. This is usually done by additions of vinylidene fluoride to the charge throughout the polymerization. The following table shows the approximate percentage of vinylidene fluoride to be maintained in the monomer mixture in order to obtain a copolymer of the stated composition:

| Vinylidene Fluoride, percent by weight in Monomer Mixture | Vinylidene Fluoride, percent by weight in Copolymer |
| --- | --- |
| 0.55 | 1 |
| 1.2 | 2 |
| 1.8 | 3 |
| 2.4 | 4 |
| 3.0 | 5 |
| 3.6 | 6 |
| 4.2 | 7 |
| 4.8 | 8 |

The copolymers may be made using as catalysts the bis(perfluoroacyl) peroxides disclosed in U.S. Patent No. 2,700,662 to D. M. Young and B. Thompson.

The following examples contribute to a better understanding of the present invention, but are not necessarily to be construed as limitations to the invention. These examples show comparative tests between natural or uncolored fluorothene, fluorothene pigmented by prior art methods and colored fluorothene resin compounds prepared according to the present invention.

*Example 1*

Ten color masterbatches were prepared in the following manner: A copolymer of vinylidene fluoride and monochlorotrifluoroethylene containing 6.25 percent vinylidene fluoride was fluxed and sheeted on a two roll mill. The front roll was generally maintained at a temperature about 15 to 20° F. warmer than the back roll. The pigment was then added and the mixture rolled for an additional 5 to 6 minutes. The relative weights of copolymer and pigment, the kind of pigments and the average roll temperature are shown in the table below.

| Masterbatch | Pigment | Copolymer | Parts by Weight Pigment | Average Roll Temperature, °F. |
|---|---|---|---|---|
| A | Ferro [1] Medium Brown, F-6111. | 80 | 20 | 360 |
| B | Ferro Yellow, F-2969 | 80 | 20 | 370 |
| C | Ferro Lemon Yellow, F-5512. | 80 | 20 | 370 |
| D | Ferro Red, F-5893 | 80 | 20 | 350 |
| E | Ferro Dark Red, F-5892. | 80 | 20 | 350 |
| F | Ferro Medium Blue, F-5590. | 80 | 20 | |
| G | Calco-Ultramarine Blue, ZD-1401. | 95 | 5 | 380 |
| H | ----do---- | 90 | 10 | 380 |
| J | ----do---- | 80 | 20 | 380 |
| K | Carbon Black (Witco 100). | 80 | 20 | 400 |

[1] Ferro Enamel Corporation, Cleveland, Ohio.

The roll sheet, which was about 20 to 30 mils thick, was then cooled and cut into chips about 3/8 inch wide and about 1/4 to 3/8 inch long.

Samples of each of the above products were compression molded at approximately 220° C. into thin films. All of these pressings appeared completely uniform colorwise by transmitted light. No pigment agglomerates or other color imperfections were found on examining the films under a microscope at 48 and 84 magnifications.

*Example II*

Nine colored fluorothene resin compositions were prepared by charging appropriate proportions of (i) Bakelite Co.'s FYTH, a natural (uncolored) fluorothene resin, and (ii) a color masterbatch from Example I into a conical blender and mixing said resin and masterbatch therein at room temperature. The particular masterbatch used and weight percent thereof charged to each mixture, the proportions (by weight) of FYTH, chlorotrifluoroethylene-vinylidene fluoride copolymer and pigment present in the overall mixture so prepared, and the FYTH-masterbatch blending time used in each instance are tabulated below.

| Mixture | Masterbatch | | Composition of overall Mixture (by weight) | | | Blending Time (Minutes) |
|---|---|---|---|---|---|---|
| | Product of Ex. No. | Parts, by weight, in mixture | FYTH | Copolymer | Pigment | |
| A | I-A | 2.5 | 97.5 | 2.0 | 0.5 | 10 |
| B | I-B | 2.5 | 97.5 | 2.0 | 0.5 | 10 |
| C | I-C | 2.5 | 97.5 | 2.0 | 0.5 | 10 |
| D | I-D | 2.5 | 97.5 | 2.0 | 0.5 | 10 |
| E | I-E | 2.5 | 97.5 | 2.0 | 0.5 | 10 |
| F | I-F | 2.5 | 97.5 | 2.0 | 0.5 | 10 |
| G | I-G | 10.0 | 90.0 | 9.5 | 0.5 | 60 |
| H | I-H | 5.0 | 95.0 | 4.5 | 0.5 | 60 |
| J | I-J | 2.5 | 97.5 | 2.0 | 0.5 | 60 |

Each of the foregoing compositions was extruded into a 10 mil thick coating on #22 silver-plated copper multistrand wire with a Modern Plastics Machinery Co. 1½ inch bore extruder fitted with a wire-coating head. The following extrusion conditions were maintained:

Cylinder—front _____ °F__ 540
Cylinder—rear _____ °F__ 450
Screw _____ °F__ 300
Head _____ °F__ 570
Die-holder _____ °F__ 545–560
Land _____ °F__ 560–570
Compound (at die) _____ °F__ 595–600
Screw speed _____r.p.m__ 27
Wire speed _____ft./min__ 65–70

The wire was preheated with a gas flame.

All coatings were smooth, even and uniform and homogeneously colored. Portions of coatings extruded from mixtures A–G were removed from the wire and compression molded at 250° C. into thin films and inspected under a microscope at 48× and 84×. No agglomerates of pigment or other non-uniformity were observed with the microscope or when the pressings were viewed by the naked eye with transmitted light.

*Example III*

Electrical and mechanical properties of end products of extrusion of the various colored compositions described in Example II were compared with those of uncolored, i.e., natural, fluorothene and a colored fluorothene pigmented according to the prior art method as discussed earlier. The natural fluorothene used in all examples was Bakelite's FYTH, having a melting point of about 210° C., specific gravity of 2.12, viscosity of 15 megapoises at 230° C. and a flow index of 12.5 to 35 at 265° C. All substances tested were extruded as a 10 mil thick coating on #22 silver-plated copper multistrand wire with a Modern Plastics Machinery Co. 1½ inch bore extruder fitted with a wire-coating head. The same extrusion conditions were maintained as those specified in Example II.

Specimens of each, taken at random, were tested to determine the ability of the insulation to withstand an electrical strain imposed after it had been subjected to various thermal and mechanical abuses.

Basically, the tests hereafter described are substantially equivalent to those prescribed in Spec. No. MIL–W–12349 (Signal Corps), sec. 4. Provision was made in each test, however, for a more definitive comparison of materials which met the requirement set forth in MIL–W–12349, i.e., ability to withstand, after a prescribed period of physical and/or thermal abuse, a specified electrical strain for one minute. The refinement consisted of raising the electrical strain level uniformly at the rate of 500 volts/sec. at the end of the one minute constant voltage period until breakdown occurred.

(a) *Voltage breakdown.*—Test specimens were coiled around 0.10 inch diameter mandrels for at least six close turns, removed from the mandrels without straightening, and immersed in tap water for one hour with both ends of the wire extending above the surface of the water. At the end of this period, 5000 volts R.M.S. was applied across the insulation between the wire conductor and the water and maintained for one minute after which time the voltage was increased at a uniform rate of 500 volts per second until breakdown occurred.

(b) *Heat shock.*—The test specimens were coiled around a 0.10 inch diameter mandrel for at least six close turns, removed from the mandrels without straightening, and subjected to a temperature of 190° C. for a 4 hour period. After a visual inspection for cracks in the insulation, the coiled specimens were immersed in tap water with both ends extending above the water and a potential difference of 2000 volts R.M.S. was applied for one minute between the wire conductor and the water, followed by a uniform increase of potential at the rate of 500 volts per second until breakdown occurred.

(c) *Heat aging stability.*—The specimens were heat aged at 150° C. in a forced draft oven for 96 hours, cooled to room temperature, and coiled around a 0.10 inch diameter mandrel at a uniform rate of 15±3 turns per minute. After removal from the mandrels without straightening, the coils were immersed for one hour in tap water with both ends above the surface of the water and a potential difference of 2000 volts R.M.S. was applied for one minute, followed by a uniform increase in potential of 500 volts per second until breakdown occurred.

(d) *Cold bend after aging.*—The specimens were aged for 96 hours at 150° C. and then conditioned at −40° C. for a period of 4 hours with one end attached to a ½ inch diameter mandrel. At the end of the conditioning period, and while still at −40° C., each specimen was coiled around the mandrel for at least 6 close turns at a uniform rate of 15±3 turns per minute. After removal from the mandrels without straightening, the coils were immersed in tap water at room temperature for 1 hour with both ends protruding above the water. At the end of this period a potential of 2000 volts R.M.S. was applied between the wire conductor and the water for one minute and then increased at a uniform rate of 500 volts per second until breakdown occurred.

Each test was performed in quintuplicate. The average breakdown voltages so determined are shown in Table I.

TABLE I.—AVERAGE BREAKDOWN VOLTAGES (IN KILOVOLTS)

| Material Tested | (a) Voltage Breakdown | (b) Heat Shock | (c) Heat Aging | (d) Cold Bend After Heat Aging |
|---|---|---|---|---|
| Natural Fluorothene (FYTH) | 18.0 | 15.5 | 15.5 | 10.9 |
| Fluorothene Colored by prior art method | 14.7 | 14.6 | 9.0 | ¹ 3.5 |
| Extruded Insulation of Example II-A | 17.1 | 18.0 | 17.0 | 10.6 |
| Extruded Insulation of Example II-B | 17.0 | 15.5 | 15.0 | 9.0 |
| Extruded Insulation of Example II-C | 16.0 | 14.3 | ² 12.0 | 12.4 |
| Extruded Insulation of Example II-D | 16.0 | 15.7 | 13.0 | 12.1 |
| Extruded Insulation of Example II-E | 17.0 | 13.8 | 15.0 | ³ 8.2 |
| Extruded Insulation of Example II-F | 14.0 | 14.0 | 14.0 | 10.1 |

¹ Average of 1 sample; 4 samples failed to survive 1 minute at 2000 volts.
² Average of 3 samples; 2 samples failed to survive 1 minute at 2000 volts.
³ Average of 4 samples; 1 sample failed to survive 1 minute at 2000 volts.

It can be seen from the foregoing data that the prior art pigmented fluorothene is inferior to the natural or uncolored parent fluorothene by all four tests, especially after heat-aging, tests (c) and (d), while the new products are substantially equivalent to the natural in all respects.

The process of this invention may be used advantageously to color any fluorothene resin which is normally solid at room temperature.

While fluorothene compounds are not generally modified except with colorants, it is possible to introduce fillers, densifiers, opacifiers and the like into a fluorothene resin by incorporating these substances in the color master-batch.

*Example IV*

A stringent test of the process of the present invention to produce superior colored fluorothene resin compounds was carried out by blending in a conical blender a mixture consisting of 97.5 parts of a natural fluorothene (FYTH), 1.25 parts of the yellow masterbatch of Example I-B and 1.25 parts of the blue masterbatch of Example I-F, then extruding said mixture under substantially the same extrusion conditions set forth in Example II, with the exception that no wire was used, to produce thin tubes. The color of the extruded product was a uniform green with no trace of blue or yellow spots or streaks or color voids.

What is claimed is:

1. Process for coloring normally solid polychlorotrifluoroethylene resin compositions which comprises forming a color masterbatch by intimately mixing a copolymer of trifluorochloroethylene and vinylidene fluoride containing from about 1 to about 20 percent interpolymerized vinylidene fluoride with a colorant material in an amount of from about 1 to about 70 parts by weight per 100 parts by weight of said copolymer, and thereafter blending said color masterbatch with normally solid polychlorotrifluoroethylene, the weight ratio of the said copolymer to said polychlorotrifluoroethylene being not greater than about 2:3.

2. Process for coloring normally solid polychlorotrifluoroethylene resin compositions which comprises forming a color masterbatch by intimately mixing a copolymer of trifluorochloroethylene and vinylidene fluoride containing from about 1 to about 20 percent interpolymerized vinylidene fluoride with an inorganic pigment in an amount of from about 5 to about 45 parts by weight per 100 parts by weight of said copolymer, and thereafter blending said color masterbatch with normally solid polychlorotrifluoroethylene, the weight ratio of said copolymer to said polychlorotrifluoroethylene being not greater than 1:1.85.

3. The process according to claim 2 wherein the copolymer of trifluorochloroethylene and vinylidene fluoride contains from about 3 to about 10 percent interpolymerized vinylidene fluoride.

4. A process for coloring normally solid polychlorotrifluoroethylene resin compositions which comprises intimately mixing a pigment and a copolymer of chlorotrifluoroethylene and vinylidene fluoride containing 1 percent to 20 percent by weight of vinylidene fluoride, said pigment being present in an amount of from about 5 to 45 parts by weight per 100 parts by weight of said copolymer, fluxing said mixture in a conventional hot processing apparatus to form a color concentrate, dry blending said color concentrate with said polychlorotrifluoroethylene resin to form a blend containing at least 75 percent by weight polychlorotrifluoroethylene, and extruding the blend, thereby producing a uniformly colored product.

5. A composition of matter suitable for making uniformly colored molded and extruded plastic articles comprising a color concentrate containing between 1 to 70 parts by weight of an inorganic pigment and 200 parts by weight of a copolymer comprising 90 to 97 parts by weight of monochlorotrifluoroethylene and complementarily 10 to 3 parts by weight of vinylidene fluoride, said concentrate being in admixture with at least 300 parts by weight of a solid polychlorotrifluoroethylene resin, said composition being prepared in accordance with claim 1.

6. A composition of matter suitable for making uniformly colored molded and extruded plastic articles comprising a color concentrate containing an inorganic pigment in an amount sufficient to constitute 0.1 to 4 percent of the total composition and 200 parts by weight of a copolymer comprising 90 to 97 parts by weight of monochlorotrifluoroethylene and complementarily 10 to 3 parts by weight of a vinylidene fluoride, said concentrate being in admixture with at least 300 parts by weight of a solid polychlorotrifluoroethylene resin, said composition being prepared in accordance with claim 1.

References Cited in the file of this patent

UNITED STATES PATENTS

| | | |
|---|---|---|
| 2,470,001 | Stober | May 10, 1949 |
| 2,512,459 | Hamilton | June 20, 1950 |
| 2,770,605 | Honn | Nov. 13, 1956 |
| 2,786,822 | Vesce | Mar. 26, 1957 |
| 2,789,959 | Smith | Apr. 23, 1957 |
| 2,866,721 | Hetherington | Dec. 30, 1958 |
| 2,866,723 | West | Dec. 30, 1958 |